(12) United States Patent
Ryoo et al.

(10) Patent No.: US 9,354,931 B1
(45) Date of Patent: May 31, 2016

(54) METHOD, SERVER AND COMPUTER-READABLE RECORDING MEDIUM FOR MANAGING SIZE OF THREAD POOL DYNAMICALLY

(71) Applicant: TMAXSOFT. CO., LTD., Gyeonggi-do (KR)

(72) Inventors: Kyoung Min Ryoo, Gyeonggi-do (KR); Moon Namkoong, Gyeonggi-do (KR); Kyung Koo Yoon, Gyeonggi-do (KR)

(73) Assignee: TMAXSOFT, CO., LTD., Gyeonggi-do (KR)

( * ) Notice: Subject to any disclaimer, the term of this patent is extended or adjusted under 35 U.S.C. 154(b) by 0 days.

(21) Appl. No.: 14/791,771

(22) Filed: Jul. 6, 2015

(30) Foreign Application Priority Data

May 14, 2015 (KR) .................. 10-2015-0067663

(51) Int. Cl.
*G06F 9/50* (2006.01)
*G06F 9/46* (2006.01)

(52) U.S. Cl.
CPC .................. *G06F 9/5005* (2013.01)

(58) Field of Classification Search
None
See application file for complete search history.

(56) References Cited

U.S. PATENT DOCUMENTS

2004/0139434 A1*  7/2004  Blythe .................. G06F 9/505
                                              718/100
2012/0239525 A1*  9/2012  Zeng .................... G06Q 30/00
                                              705/26.8

* cited by examiner

*Primary Examiner* — Eric C Wai
(74) *Attorney, Agent, or Firm* — Husch Blackwell LLP

(57) ABSTRACT

A method for managing a size of a thread pool dynamically is disclosed. The method includes the steps of: (a) a processor increasing a maximum thread size if the number of threads included in the thread pool is close to the maximum thread size; and (b) the processor comparing a size of a task queue before the increase of the maximum thread size with that after the increase thereof by referring to information on the size of the task queue, and increasing the maximum thread size again if the size of the task queue after the increase thereof is larger than, or equal to, that before the increase thereof.

18 Claims, 5 Drawing Sheets

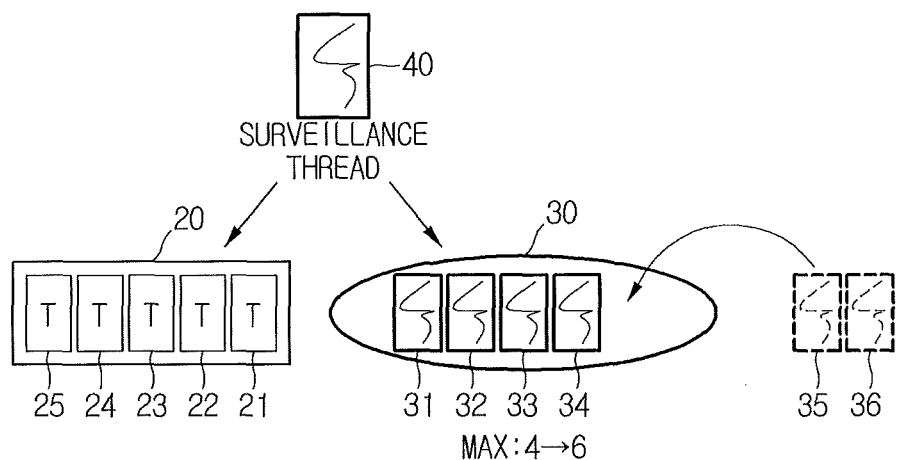
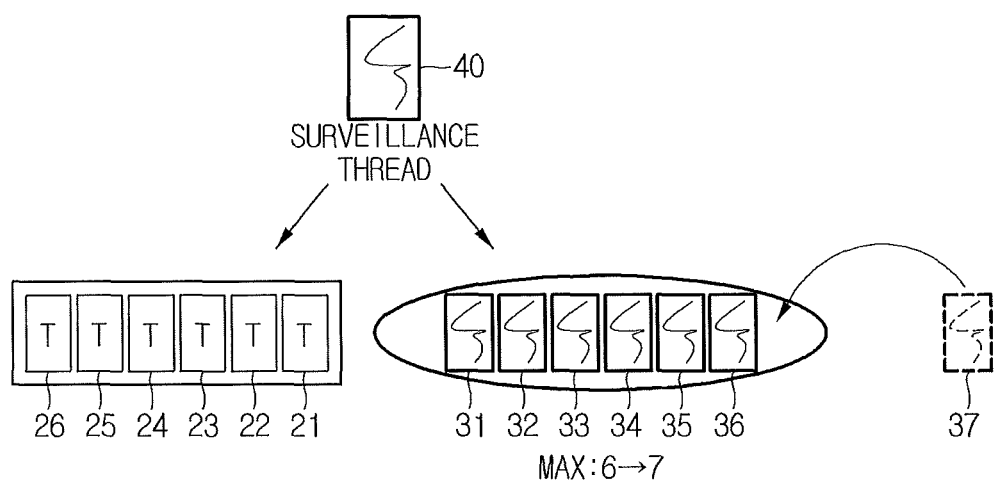

METHOD, SERVER AND COMPUTER-READABLE RECORDING MEDIUM FOR MANAGING SIZE OF THREAD POOL DYNAMICALLY

CROSS REFERENCE TO RELATED APPLICATION

This application claims priority to and incorporates herein by reference all disclosure in Korean Patent Application No. 10-2015-0067663 filed May 14, 2015.

FIELD OF THE INVENTION

The present invention relates to a method, a server, and a computer readable recording medium for managing size of a thread pool dynamically; and more particularly, to the method, the server, and the computer readable recording medium for (a) increasing a maximum thread size if the number of threads included in the thread pool is close to the maximum thread size; and (b) comparing a size of a task queue before the increase of the maximum thread size with that of the task queue after the increase of the maximum thread size, and increasing the maximum thread size again if the size of the task queue after the increase thereof is equal to, or larger than, that before the increase thereof.

BACKGROUND OF THE INVENTION

A thread of execution is the smallest sequence of programmed instructions that can be managed independently by a scheduler, which is typically a part of the operating system. The thread has a thread ID, a program counter, a register set, a stack, etc. to deal with a requested specific service, and shares other resources such as codes, data, files, etc. with other threads.

Conventional servers may create a thread whenever a request is received from a client, and this is a mechanism effective enough to deal with most tasks. However, in case of servers where connections and disconnections from clients occur very busily, as it takes a more time for such servers to create and remove threads than to deal with requests, the performance of the system may be degraded. Moreover, when the requests from the clients are rapidly increasing and the threads are created for the respective requests, thread scheduling is required to deal with the threads, and therefore, overhead time of the system may increase.

To solve such problems, methods of using a thread pool which includes a limited number of threads already created and does not remove executed threads to recycle the executed threads were suggested.

The thread pool, as a set of threads including at least one thread, recycles the executed threads by allocating them to other tasks, instead of removing them. More specifically, the thread pool may provide a specific thread to allow a specified task to be executed by a corresponding processor and then, if the processor completes the execution of the specific thread, after some waiting time, the thread pool may allow another tasks to be allocated to the specific thread.

The thread pool includes and manages information on the number of threads to be kept to the minimum (i.e., a minimum thread size) and information on the number of threads that can be created to the maximum (i.e., maximum thread size). But it is not easy to decide the minimum thread size and the maximum thread size for optimizing the performance of the server.

Most conventional methods may pre-set values of the minimum thread size and the maximum thread size depending on the number or types of service requests, measure the performance by using the pre-set values thereof and then determine optimal number of threads by referring to the measured performance. But since the conventional methods require more time while experiments have been made to accumulate the performance records and it is difficult to determine the minimum thread size or the maximum thread size properly under a rapidly changing web environment in real time, it is not easy to guarantee the accuracy with respect to the performance records.

Besides, there is another conventional method in which necessary threads are pre-created by predicting the number of necessary threads, but it has no great difference in performance from a still another method for creating threads after receiving a request, and it is also difficult to guarantee the accuracy of prediction due to the characteristics of the rapidly changing web environment.

Moreover, there is a still yet another method in which throughput is measured as amount of tasks processed per unit time and then the proper number of threads is determined by referring to the measured throughput, but since the throughput is also measured by using at least one thread, it is difficult to measure the throughput rapidly under the situation where tasks are rushed.

Accordingly, a new technology for enhancing the system efficiency by deciding optimal thread pool size dynamically under the rapidly changing web environment in real time is required.

SUMMARY OF THE INVENTION

It is an object of the present invention to solve all the aforementioned problems.

It is another object of the present invention to provide technology capable of increasing system efficiency by determining optimal thread pool size dynamically under a rapidly changing web environment in real time.

It is still another object of the present invention to solve a problem of overhead occurring due to thread scheduling if there are too many threads and solve a problem of waiting time occurring in an operating system due to the lack of the number of threads by determining the proper maximum thread size on reference to change in task queue size in real time.

In accordance with one aspect of the present invention, there is provided a method for managing a size of a thread pool dynamically, including the steps of: (a) a processor increasing a maximum thread size if the number of threads included in the thread pool is close to the maximum thread size; and (b) the processor comparing a size of a task queue before the increase of the maximum thread size with that after the increase thereof by referring to information on the size of the task queue, and increasing the maximum thread size again if the size of the task queue after the increase thereof is larger than, or equal to, that before the increase thereof.

In accordance with another aspect of the present invention, there is provided a server for managing size of a thread pool dynamically, including: a processor; a communication part for acquiring a request for a task; and a memory for storing information on a size of a task queue and information on a maximum thread size with respect to a thread pool; wherein the processor (i) increases the maximum thread size if the number of threads included in the thread pool is close to the maximum thread size and then stores it in the memory; and (ii) compares a size of the task queue before the increase of the maximum thread size with that after the increase thereof by referring to information on the size of the task queue, and increases the maximum thread size again and stores it in the memory, if the size of the task queue after the increase thereof is larger than, or equal to, that before the increase thereof.

BRIEF DESCRIPTION OF THE DRAWINGS

The above and other objects and features of the present invention will become apparent from the following description of preferred embodiments given in conjunction with the accompanying drawings, in which:

FIGS. 3A and 3B are drawings to explain one example embodiment of increasing the maximum thread size of the thread pool if size of a task queue increases.

DETAILED DESCRIPTION OF THE PREFERRED EMBODIMENTS

Figure 1:
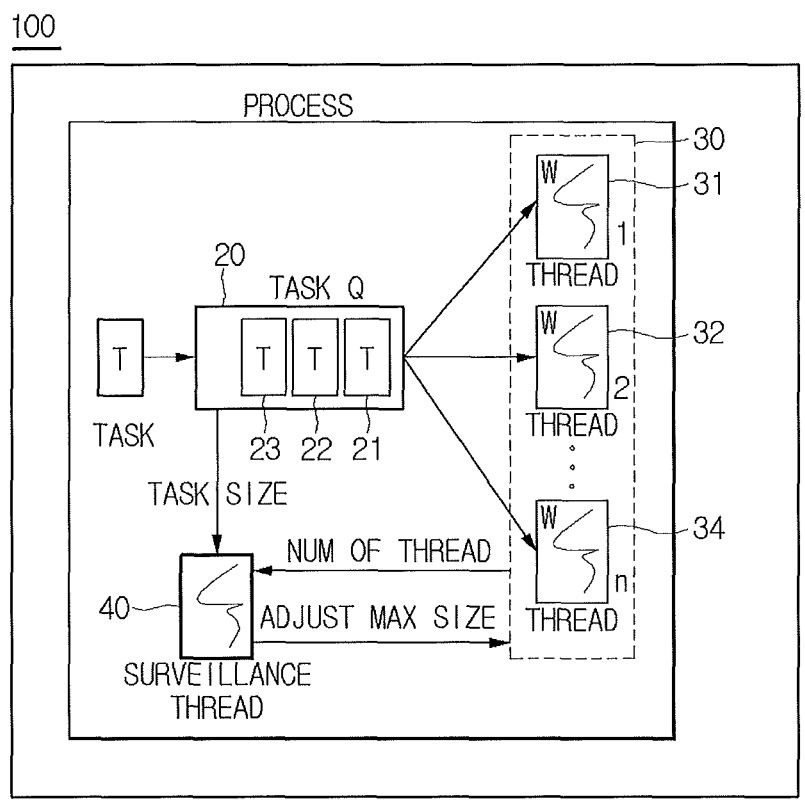
FIG. 1 is a concept map for roughly explaining a method for allowing a server to manage size of a thread pool dynamically in accordance with one example embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

FIG. 1 is a concept map for roughly explaining a method for allowing a server to manage size of a thread pool dynamically in accordance with one example embodiment of the present invention.

First of all, by referring to FIG. 1, it could be found that an operating system of a server 100 in accordance with one example embodiment of the present invention manages at least one process to execute a program and each process includes a task queue 20 which includes at least one of tasks 21, 22, and 23 therein, and a thread pool 30 which includes at least one of worker threads 31, 32, 33, and 34 therein. The operating system may allow at least one of the multiple tasks to be allocated to the at least one of the worker threads 31, 32, 33, and 34, respectively.

The number of threads less than the maximum thread size may be created and included in the thread pool 30 and the operating system takes out a task from the task queue 20 and then allocates it to a worker thread included therein. A thread which has been executed may wait in the thread pool until a next task is allocated thereto without being eliminated.

In the thread pool 30, the maximum thread size representing the maximum number of threads retainable therein and the minimum thread size representing the minimum number of threads retainable therein may be set.

But it is not easy to determine the minimum number of threads or the maximum number of threads properly under the rapidly changing web environment in real time. Thus, in accordance with one example embodiment of the present invention, a server may adjust the maximum number of threads in real time under a method as shown below.

The operating system of the server in accordance with one example embodiment of the present invention has a surveillance thread 40, which may perform a function of adjusting the maximum thread size of the thread pool 30 by checking status of the task queue 20 and the thread pool 30 in real time. For reference, it is illustrated in FIG. 1 that the surveillance thread 40 is not included in the thread pool 30 but it would not be limited thereto.

More specifically, the surveillance thread 40 may monitor whether the number of threads included in the thread pool 30 approaches the maximum thread size within a certain scope. If the number of threads included in the thread pool 30 is close to the maximum thread size, the surveillance thread 40 may increase the maximum thread size slowly. Herein, "close to" includes a concept of "same as". This is a case for increasing the number of threads in the thread pool 30 by increasing the maximum thread size slowly because the number of threads in the thread pool 30 may be insufficient to deal with the rushing tasks effectively.

At the time, it is necessary to increase the maximum thread size slowly because it is impossible to know the degree of the CPU workload of each task allocated to each thread. When a task is requested, the task may have an idle time section in which the CPU does not be used due to the use of I/O or network, etc. and a work time section in which calculating process is performed by using the CPU. If a lot of tasks that need a long idle time are requested, more threads must be created by increasing the maximum thread size. If more threads are created by increasing the maximum thread size largely at a time, this may give adverse effect on system performance due to context switching, and therefore, a method for increasing the maximum thread size slowly may draw maximum performance while securing system stability. So with the case of a lot of tasks that need a short idle time and a long work time. Detailed explanation on a concept of "increasing slowly" will be made later.

Even after increasing the maximum thread size, the surveillance thread 40 may observe whether the task queue size is constant or increased compared to the previous one. If the task queue size is constant or increased compared to the previous one, it may represent that service requests are rushing to the server so that the maximum thread size may be increased again. Contrarily, if the size of the task queue 20 is reduced, it may mean that the current maximum thread size of the thread pool 20 is proper or excessive so that it may not be necessary to increase any more, or may reduce, the maximum thread size.

According to queuing theory, if a value multiplying the number of threads by the number of processable requests per thread is greater than the number of incoming requests per unit time, the system is judged to be stable. In an inverse case, the number of incoming requests inputted to the system becomes greater than the number of outgoing requests whose corresponding tasks has been executed so that the balance becomes collapsed. In this case, a capacity of executing tasks must be increased by increasing the maximum thread size.

To determine whether it is balanced or not, it is possible to check the number of incoming requests and the number of outgoing requests, but, in order to measure the number of incoming requests and the number of outgoing requests, it is necessary for each thread to access one field managed by the threshold pool 30 by acquiring the lock whenever each thread starts or ends a task. Therefore, this method gives adverse effect on the performance of the system. It is possible to measure a time of a task waiting in the task queue 20 or a time of a thread executing a task as well, but just for the same reason as the case of checking the number of requests, the system performance deteriorates. Contrarily, if the task queue 20 that is unnecessary to acquire the lock when the size of the task queue 20 is measured is used, just as shown in the present invention, the method for measuring the size of the task queue 20 does not give bad effect on the system so that the system performance may be increased compared to the previous method.

As such, the operating system of the server 100 in accordance with one example embodiment of the present invention may adjust the maximum thread size optimally while observing the size of the task queue 20 and the number of threads included in the thread pool 30 in real time through the surveillance thread 40.

The more specific explanation on the configuration and operation of the server will be made below.

Figure 2:
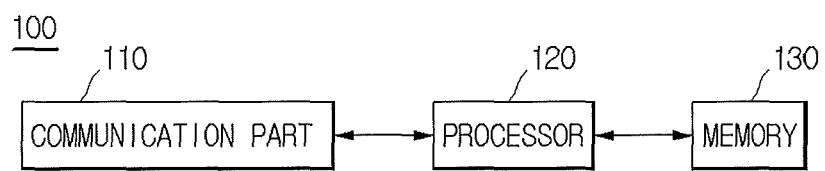
FIG. 2 is a block diagram of the server in accordance with one example embodiment of the present invention.

FIG. 2 is a block diagram of the server in accordance with one example embodiment of the present invention.

By referring to FIG. 2, the server 100 for managing the size of the thread pool dynamically in accordance with one example embodiment of the present invention may include a communication part 110, a processor 120, and a memory 130.

In accordance with one example embodiment of the present invention, the server 100, herein, means a digital device that has a memory and a processor with a computational ability. In particular, the server 100 may be implemented as a web server that provides a service in reply to a request of a client terminal.

The communication part 110 may acquire a request for executing a task. For example, if there is a HTTP request from a client, the communication part 110 may acquire such a request.

The processor 120 controls the overall operation of the server 100 in accordance with one example embodiment of the present invention. In particular, the processor 120 allows the surveillance thread 40 to be operated on the operating system of the server 100. More specifically, the processor 120 may allow the surveillance thread 40 to determine whether the number of threads included in the thread pool 30 is close to the maximum thread size. If the number of threads is close to the maximum thread size, the processor 120 may increase the maximum thread size and store it in the memory 130 to be explained later (so-called a first increasing step).

For example, if the maximum thread size currently set is 100, the processor 120 may instruct the surveillance thread 40 to check whether the thread pool 30 has not less than 99 threads or 99% of the maximum thread size, including threads to which tasks are allocated. If the thread pool 30 has not less than 99 threads, the processor 120 may instruct the surveillance thread 40 to increase the maximum thread size to 120 and store the status of the maximum thread size in the memory 130.

As such, if the number of threads included in the thread pool 30 is close to the certain scope, even though not being equal to the maximum thread size, the processor 120 may instruct the surveillance thread 40 to increase the maximum thread size to prevent the number of threads from being saturated.

Of course, if the number of threads included in the thread pool 30 is equal to the maximum thread size, the processor 120 may instruct the surveillance thread 40 to increase the maximum thread size to store it in the memory 130.

Thereafter, the processor 120 may instruct the surveillance thread 40 to compare the size of the task queue 20 before the increase of the maximum thread size with that of the task queue after the increase of the maximum thread size by referring to information on the size of the task queue 20 stored in the memory 130. In addition, if the size of the task queue 20 after the increase of the maximum thread size is larger than, or equal to, that before the increase thereof, the processor 120 may instruct the surveillance thread 40 to increase the maximum thread size again to store it in the memory 130 (so-called a second increasing step). In this case, even though the maximum thread size has been increased, as it is determined that the number of the current threads is insufficient to perform the rushing tasks in light of the fact that the size of the task queue 20 is maintained as equally as the previous one or increased in comparison with the previous one, the processor 120 increases the maximum thread size again. If there is no change in the size of the task queue 20 even though the maximum thread size has been increased, it means that the size of the task queue 20 is not changed even though a new thread has been created due to the increase of the maximum thread size and then the task of the task queue 20 has been allocated to the new thread. In this case, because the number of current threads is not enough to reduce rushing workload, it could be also processed similarly to the case in which the size of the task queue 20 is increased.

Meanwhile, an amount of increase in the maximum thread size through the first increasing step and that through the second increasing step may be set differently. For example, if the number of threads, at first, is close to the maximum thread size, it can be considered that tasks start rushing so that the maximum thread size is increased relatively by a great amount. After the maximum thread size is increased as described above, if the maximum thread size is increased again due to the increased size of the task queue 20, it is necessary to adjust the maximum thread size minutely, i.e., increase the maximum thread size by a small amount. Of course, various examples could be also considered.

The processor 120 may instruct the surveillance thread 40 to refer to the size of the task queue 20 without instructing the surveillance thread 40 to acquire the lock. In other words, the processor 120 may adjust the maximum thread size while preventing the system performance from being deteriorated by allowing the surveillance thread 40 to acquire the size of the task queue 20 with a snapshot without holding the lock.

Meanwhile, although the maximum thread size is determined to be increased, the processor 120 may wait for a prefixed time to make the system reflect the increased maximum thread size and then increase the maximum thread size. More specifically, the processor 120 may instruct the surveillance thread 40 to acquire the size of the task queue 20 with the snapshot at an interval of the prefixed time, e.g., 0.1 second, to judge increase or decrease of the size of the task queue 20. After having adjusted the maximum thread size, the processor 120 may allow the increased maximum thread size to be reflected on the system by waiting for a certain period of time without determining the increase or the decrease of the size of the task queue 20 or adjusting the maximum thread size, even though the surveillance thread 40 has acquired the size of the task queue 20 with the snapshot.

If the maximum thread size is increased by using the aforementioned method, the processor 120 may create a new thread as much as the increased maximum thread size and put it in the thread pool 30. Then, the processor 120 may acquire a new task from the task queue 20 and allocate it to the created new thread.

For example, if the processor 120 allows the surveillance thread 40 to increase the maximum thread size currently set to 120, the processor 120 may compare the size of the task queue 20 at the maximum thread size of 100 with that at the maximum thread size of 120. If the size of the task queue 20 after the maximum thread size of 120 is equal to, or larger than, that at the maximum thread size of 100, the processor 120 may instruct the surveillance thread 40 to increase the maximum thread size again to 140 and then store it in the memory 130 because it is determined that more threads are required by referring to the fact that the number of tasks included in the task queue 20 does not decrease even though the maximum thread size is set to 120.

FIGS. 3A and 3B are drawings to explain one example embodiment of increasing the maximum thread size of the thread pool if the task queue size is increased.

By referring to FIG. 3A, it is assumed that the task queue 20 has five tasks 21, 22, 23, 24, and 25 at an initial state. If there are four threads included in the thread pool 30 and the maximum thread size is 4 at the initial state, the number of threads included in the thread pool 30 could be determined to have been close to the maximum thread size. Then, just as shown in FIG. 3A, the processor 120 may instruct the surveillance thread 40 to increase the maximum thread size from 4 to 6 and to create new threads 35 and 36.

Since the size of the task queue 20 is increased from 5 (before the increase of the maximum thread size from 4 to 6 as shown in FIG. 3A) to 6 (after the increase of the maximum thread size as shown from 4 to 6 as shown in FIG. 3B), the processor 120 may instruct the surveillance thread 40 to increase the maximum thread size by 1 again and to create a new thread 37.

Meanwhile, even though the size of the task queue 20 after the increase of the maximum thread size is equal to, or larger than, that before the increase thereof, if the number of threads included in the thread pool 30 is less than the maximum thread size, the processor 120 may instruct the surveillance thread 40 to stop increasing the maximum thread size of the thread pool 30. The reason of stopping the increase of the maximum thread size is that the server 100 is regarded as too overloaded to increase the number of threads even though it has instructed the surveillance thread 40 to increase the maximum thread size.

Similarly, even though the maximum thread size has been increased again, if the number of threads included in the thread pool 30 fails to be close to the maximum thread size increased again, the processor 120 may instruct the surveillance thread 40 to stop the increase of the maximum thread size.

Besides, after waiting for a preset time to make the maximum thread size, if being adjusted, reflected on the system, the processor 120 may determine at least either of whether the size of the task queue 20 is increased or reduced and whether the number of threads included in the thread pool 30 is close to the maximum thread size within a certain scope. If the number of threads included in the thread pool 30 fails to be close to the maximum thread size within the certain scope even though the processor 120 waits for the preset time, the processor 120 may instruct the surveillance thread 40 to stop the increase of the maximum thread size. It is because it could be seen as overload just as shown above.

Figure 4A:
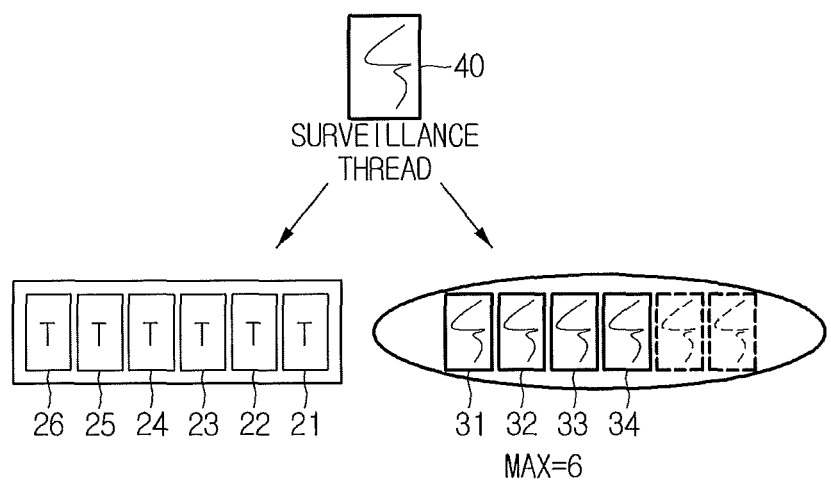
FIGS. 4A and 4B are drawings to explain one example embodiment of stopping increasing the maximum thread size if the number of threads included in the thread pool cannot be increased due to system overload even though the maximum thread size has been increased.
Figure 4B:
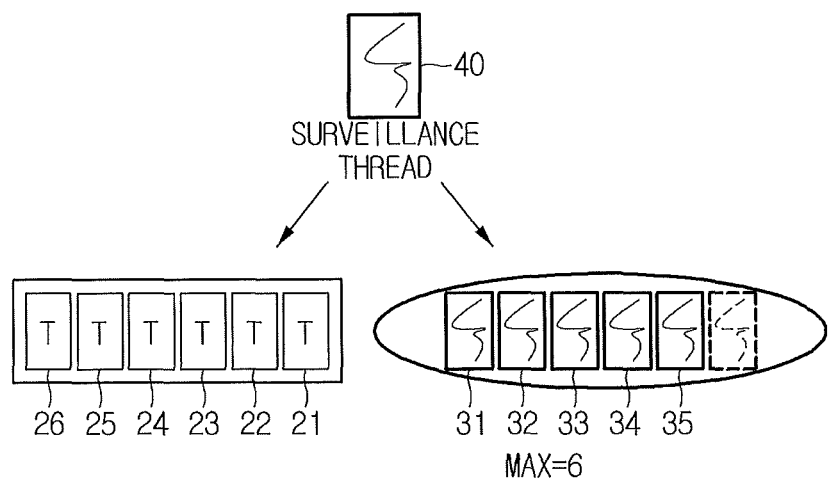

FIGS. 4A and 4B are drawings to explain one example embodiment of stopping increasing the maximum thread size if the number of threads included in the thread pool cannot be increased due to system overload even though the maximum thread size has been increased.

By referring to FIG. 4A, while the processor 120 has increased the maximum thread size to 6 due to the increase of the size of the task queue 20, the number of threads included in the thread pool 30 fails to be close to the maximum thread size of 6 but is maintained as a value of 4. Therefore, the processor 120 may instruct the surveillance thread 40 to stop the increase of the maximum thread size. In FIG. 4B, a new thread 35 is created in the thread pool 30, but the increase of the maximum thread size is stopped. Therefore, it can be found that the maximum thread size is still 6.

Moreover, if the size of the task queue 20 decreases with the lapse of a prefixed time after the maximum thread size has increased, the processor 120 may instruct the surveillance thread 40 to stop the increase of the maximum thread size because it can be seen that the tasks having been waiting in the task queue 20 will be handled by the increased threads.

In addition, when the number of threads included in the thread pool 30 is out of the certain scope from the maximum thread size with the lapse of a certain time after the increase of the maximum thread size is stopped, the processor 120 may instruct the surveillance thread 40 to reduce the maximum thread size. If the number of threads included in the thread pool 30 is reduced out of the certain scope from the maximum thread size while the maximum thread size is not increased, it means that the number of current threads is enough to deal with tasks. Therefore, the maximum thread size is reduced.

Additionally, even after the maximum thread size has been reduced, if the size of the task queue is not increased or the number of threads included in the thread pool 30 is still out of the certain scope from the maximum thread size, the processor 120 may instruct the surveillance thread 40 to reduce the maximum thread size continuously.

Figure 5A:
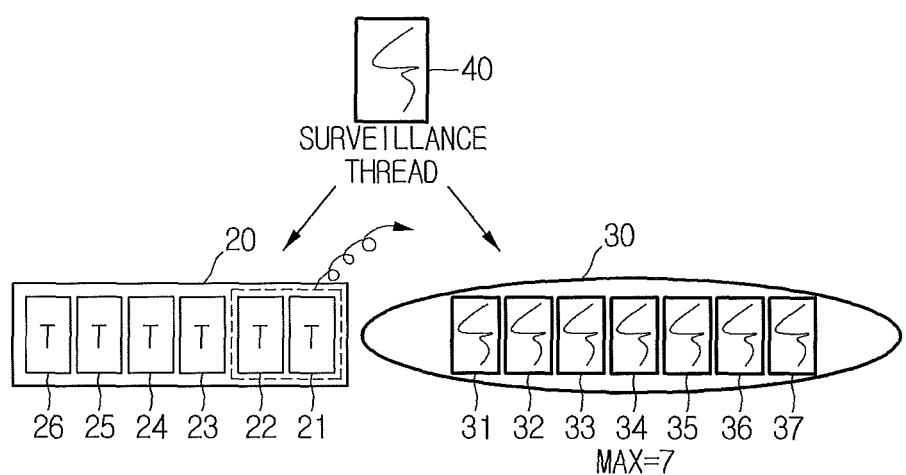
FIGS. 5A and 5B are drawings to explain one example embodiment of stopping the increase of the maximum thread size of the thread pool or reducing the maximum thread size of the thread pool if the task queue size decreases.
Figure 5B:
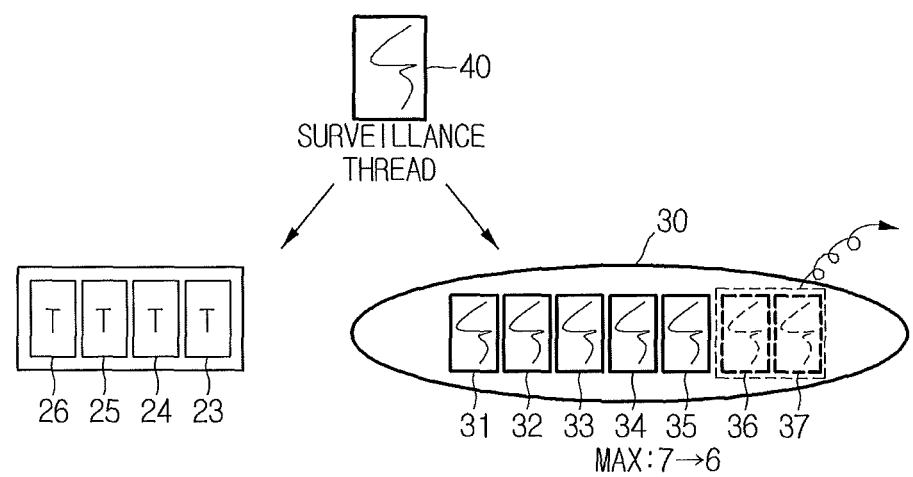

FIGS. 5A and 5B are drawings to explain one example embodiment of stopping the increase of the maximum thread size of the thread pool or reducing the maximum thread size of the thread pool if the task queue size decreases.

FIG. 5A illustrates the states of the task queue 20 and the thread pool 30 after the maximum thread size is increased to 7 as shown in FIG. 3B. In FIG. 3B, the task queue 20 has six tasks 21, 22, 23, 24, 25, and 26 but as shown in FIG. 5A, it could be known that two tasks 21 and 22 are allocated to the threads 36 and 37 and then deleted from the task queue 20. Then, the processor 120 may instruct the surveillance thread 40 to stop increasing the maximum thread size because the size of the task queue 20 has been reduced after the adjustment of the maximum thread size. Just as shown in FIG. 5B, if the number of threads included in the thread pool 30 is reduced to less than 5 which is out of the certain scope from the maximum thread size from 7, the processor 120 may instruct the surveillance thread 40 to reduce the maximum thread size by 1.

Besides, an amount of increase or decrease in the maximum thread size may be determined by referring to the number of CPU cores. As an example embodiment, the maximum thread size may be increased or decreased by n times as large as the number of CPU cores by referring to the number of all the threads included in the thread pool 30. For reference, n might be an integer or a fractional number such as ½. For example, on assumption that there are four CPU cores, if there are a total of 100 threads included in the thread pool 30, the maximum thread size may be increased or decreased by 4 and if there are 200 threads therein, the maximum thread size may be increased or decreased by 8. However, it is only an example to decide the amount of increase or decrease in the maximum thread size by referring to the number of CPU cores. Of course, the amount of increase or decrease in the maximum thread size could be decided in a different method.

Figure 6A:
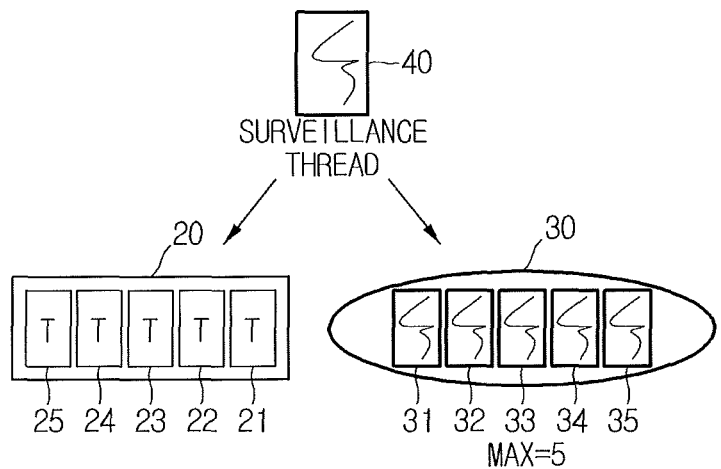
FIGS. 6A to 6C are diagrams illustrating one example embodiment of determining degree of increase or decrease of the maximum thread size depending on the degree of increase of decrease of the task queue size.
Figure 6B:
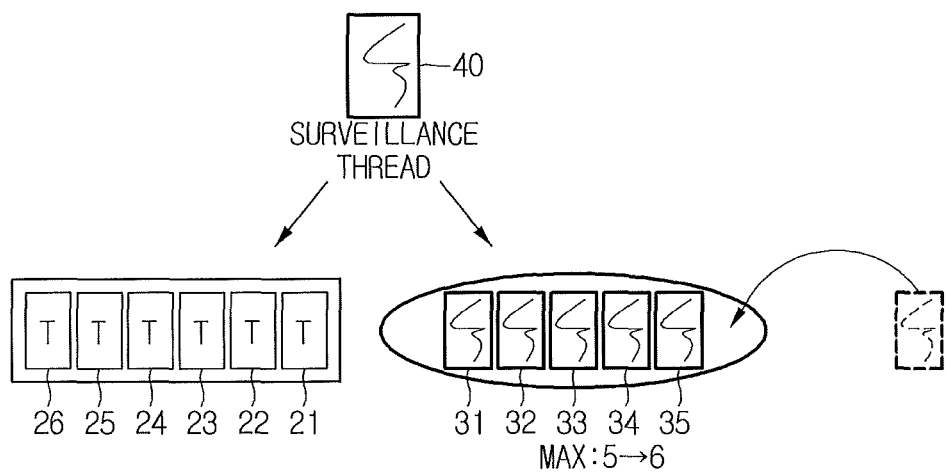
Figure 6C:
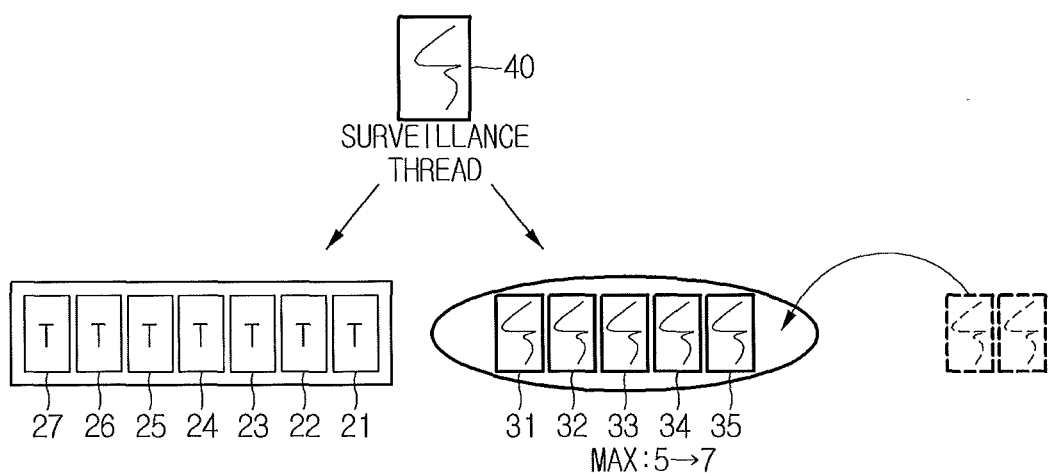

FIGS. 6A to 6C are diagrams illustrating one example embodiment of determining degree of increase or decrease of the maximum thread size depending on the degree of increase of decrease of the task queue size.

In the aforementioned example embodiments, the amount of increase or decrease in the maximum thread size may be decided by referring to the degree of difference between the size of the task queue 20 after the increase or the decrease of the maximum thread size and that before the increase or the decrease thereof.

By referring to FIG. 6A, the size of the task queue 20 is 5, the maximum thread size is 5 and the thread pool 30 includes five threads. If the size of the task queue 20 is increased from 5 (as shown in FIG. 6A) to 6 (as shown in FIG. 6B), the processor 120, as explained above, may instruct the surveillance thread 40 to increase the maximum thread size to 6. However, if the size of the task queue 20 is increased from 5 (as shown in FIG. 6A) to 7 (as shown in FIG. 6C), the processor 120, as explained above, may instruct the surveillance thread 40 to increase the maximum thread size to 7. As such, the amount of increase or decrease in the maximum thread size may be decided by referring to the degree of difference between the size of the task queue 20 after the increase or the decrease of the maximum thread size and that before the increase or the decrease thereof.

Meanwhile, the processor 120 may include multiple cores, through which the surveillance thread 40 and multiple worker threads are executed respectively. In this case, one of the multiple cores may execute the surveillance thread 40 while the other cores execute the worker threads. As another example, the multiple cores may execute the surveillance thread 40 or the worker threads by turns. Besides, it is also possible for one core to execute the surveillance thread 40 and the worker threads by turns.

By referring to FIG. 2 again, the memory 130 of the server 100 in accordance with one example embodiment of the present invention may store a variety of data required to manage the size of the thread pool dynamically. First of all, the task queue 20 in the memory 130 may store pointers of the data of tasks. In addition, the memory 130 may be used as well for the record of the data of threads and the context switching. Besides, the memory 130 may store the size of the task queue 20, and the maximum and the minimum thread sizes set with respect to the thread pool 30.

The present invention has the effects as shown below.

First, it has an effect of increasing system efficiency by determining optimal thread pool size dynamically under a rapidly changing, real-time web environment.

Second, it has another effect of reducing overhead arising from thread scheduling if there are too many threads and reducing a waiting time of a task in an operating system due to the lack of the number of threads by determining proper maximum thread size by referring to the change of the task queue size in real time.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optimal media such as CD-ROM and DVD, magneto-optimal media such as floptimal disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for managing a size of a thread pool dynamically, comprising the steps of:
   (a) a processor increasing a maximum thread size if the number of threads included in the thread pool is within a predetermined amount of the maximum thread size; and
   (b) the processor comparing a size of a task queue before the increase of the maximum thread size with that after the increase thereof by referring to information on the size of the task queue, and increasing the maximum thread size again if the size of the task queue after the increase thereof is larger than, or equal to, that before the increase thereof;
   (c) stopping increasing the maximum thread size if the size of the task queue is decreased after the step of (b) or the number of threads included in the thread pool fails to be within a predetermined amount from the maximum thread size calculated at the step of (b) even though the maximum thread size has been increased again at the step of (b),
   wherein, at the step of (c), if the size of the task queue is decreased or the number of threads included in the thread pool fails to be within a predetermined amount from the maximum thread size calculated at the step of (b) after a prefixed time from the completion of the step of (b) even though the maximum thread size has been increased again at the step of (b), the increase of the maximum thread size is stopped.

2. The method of claim 1, wherein the step of (a) includes the steps of:
   (a1) the processor creating at least one new thread as much as an amount of increase in the maximum thread size and putting the created new thread in the thread pool; and
   (a2) the processor acquiring at least one new task from the task queue and allocating the acquired new task to the created new thread.

3. The method of claim 1, wherein, at the step of (b), even though the size of the task queue after the increase thereof is larger than, or equal to, that before the increase thereof, if the number of threads included in the thread pool is less than the maximum thread size, the processor stops increasing the maximum thread size of the thread pool.

4. The method of claim 1, wherein, at the step of (a), if the number of threads included in the thread pool is equal to the maximum thread size, the processor increases the maximum thread size.

5. The method of claim 1, wherein, at the step of (b), the processor refers to the size of the task queue without acquiring the lock.

6. The method of claim 1, wherein an amount of increase in the maximum thread size at the step of (a) and that in the maximum thread size at the step of (b) are determined by referring to the number of cores of a CPU.

7. The method of claim 1, wherein an amount of increase in the maximum thread size at the step of (a) and that in the maximum thread size at the step of (b) are differently set.

8. The method of claim 1, wherein an amount of increase in the maximum thread size at the step of (b) is determined by referring to a degree of difference between the size of the task queue after the increase of the maximum thread size and that before the increase thereof.

9. The method of claim 1, wherein, at the step of (a), the processor instructs a surveillance thread to increase the maximum thread size.

10. A server for managing size of a thread pool dynamically, comprising:
    a processor;
    a communication part for acquiring a request for a task; and
    a memory for storing information on a size of a task queue and information on a maximum thread size with respect to a thread pool;
    wherein the processor (i) increases the maximum thread size if the number of threads included in the thread pool is within a predetermined amount of the maximum thread size and then stores it in the memory; and (ii) compares a size of the task queue before the increase of the maximum thread size with that after the increase thereof by referring to information on the size of the task queue, and increases the maximum thread size again and stores it in the memory, if the size of the task queue after the increase thereof is larger than, or equal to, that before the increase thereof;
    wherein the processor stops increasing the maximum thread size if the size of the task queue is decreased or the number of threads included in the thread pool fails to be within a predetermined amount from the maximum thread size calculated even though the maximum thread size has been increased again at (ii); and
    wherein, if the size of the task queue is decreased or the number of threads included in the thread pool fails to be within a predetermined amount from the maximum thread size at (ii) after a prefixed time from the completion of (ii) even though the maximum thread size has been increased again, the processor stops increasing the maximum thread size.

11. The server of claim 10, wherein the processor creates at least one new thread as much as an amount of increase in the maximum thread size and puts the created new thread in the thread pool, and then acquires at least one new task from the task queue and allocates the acquired new task to the created new thread.

12. The server of claim 10, wherein, at (ii), even though the size of the task queue after the increase thereof is larger than, or equal to, that before the increase thereof, if the number of threads included in the thread pool is less than the maximum thread size, the processor stops increasing the maximum thread size of the thread pool.

13. The server of claim 10, wherein, if the number of threads included in the thread pool is equal to the maximum thread size, the processor increases the maximum thread size and then stores it in the memory.

14. The server of claim 10, wherein the processor refers to the size of the task queue without acquiring the lock.

15. The server of claim 10, wherein an amount of increase in the maximum thread size at (i) and that in the maximum thread size at (ii) are determined by referring to the number of cores of a CPU.

16. The server of claim 10, wherein am amount of increase in the maximum thread size at (i) and that in the maximum thread size at (ii) are differently set.

17. The server of claim 10, wherein an amount of increase in the maximum thread size at (ii) is determined by referring to a degree of difference between the size of the task queue after the increase of the maximum thread size and that before the increase thereof.

18. The server of claim 10, wherein the processor instructs a surveillance thread to increase the maximum thread size and store it in the memory.

* * * * *